(12) United States Patent
Propheter-Hinckley et al.

(10) Patent No.: US 11,041,395 B2
(45) Date of Patent: Jun. 22, 2021

(54) AIRFOILS AND CORE ASSEMBLIES FOR GAS TURBINE ENGINES AND METHODS OF MANUFACTURE

(71) Applicant: United Technologies Corporation, Farmington, CT (US)

(72) Inventors: Tracy A. Propheter-Hinckley, Rocky Hill, CT (US); Emma J. Place, New Hartford, CT (US); Timothy J. Jennings, West Hartford, CT (US); Jeremy B. Fredette, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 66 days.

(21) Appl. No.: 16/453,101

(22) Filed: Jun. 26, 2019

(65) Prior Publication Data

US 2020/0408102 A1    Dec. 31, 2020

(51) Int. Cl.
*F01D 9/06* (2006.01)
*F01D 25/08* (2006.01)
*F04D 29/64* (2006.01)

(52) U.S. Cl.
CPC ............ *F01D 9/065* (2013.01); *F01D 25/08* (2013.01); *F04D 29/644* (2013.01);
(Continued)

(58) Field of Classification Search
CPC .......... F01D 5/147; F01D 5/186; F01D 5/187; F01D 5/20; F01D 9/041; F01D 9/065;
(Continued)

(56) References Cited

U.S. PATENT DOCUMENTS 6,257,831 B1 *  7/2001  Papple ...................... B22C 9/10
                                                      416/97 R
7,377,747 B2    5/2008  Lee
(Continued)

FOREIGN PATENT DOCUMENTS

EP     1634665 A2    3/2006
FR     3072415 A1    4/2019
(Continued)

OTHER PUBLICATIONS

Partial European Search Report for European Application No. 20182441.4, International Filing Date Jun. 26, 2020, dated Sep. 4, 2020, 15 pages.
(Continued)

*Primary Examiner* — Igor Kershteyn
(74) *Attorney, Agent, or Firm* — Cantor Colburn LLP

(57) ABSTRACT

Methods for forming airfoils, core assemblies, and airfoils for gas turbine engines are described. The methods include forming an airfoil body about a core assembly configured to define one or more internal cavities of the airfoil body, the core assembly comprising at least core structure having a purge slot protrusion extending from a portion of the core structure, removing the core assembly from the airfoil body to form one or more internal cavities, wherein at least one internal cavity has a cavity extension define by the purge slot protrusion, and forming a squealer pocket in a tip of the formed airfoil body, wherein a cavity purge slot is formed at the cavity extension to fluidly connect the respect internal cavity with the squealer pocket.

19 Claims, 8 Drawing Sheets

(52) U.S. Cl.
CPC ...... *F05D 2240/11* (2013.01); *F05D 2240/14* (2013.01); *F05D 2240/15* (2013.01)

(58) Field of Classification Search
CPC ....... B22C 9/10; B22C 9/103; F05D 2230/11; F05D 2230/12; F05D 2230/21; F05D 2240/307; F05D 2260/202; F05D 2260/605; F05D 2260/607
See application file for complete search history.

(56) References Cited

U.S. PATENT DOCUMENTS

| | | | |
|---|---|---|---|
| 7,654,795 B2 | 2/2010 | Tibbott | |
| 7,695,243 B2 | 4/2010 | Lee et al. | |
| 9,279,331 B2 | 3/2016 | Levine et al. | |
| 9,890,644 B2 | 2/2018 | Tran et al. | |
| 9,938,837 B2 | 4/2018 | Levine et al. | |
| 2008/0164001 A1 | 7/2008 | Morris et al. | |
| 2010/0303625 A1* | 12/2010 | Kuhne | F01D 5/20 416/91 |
| 2015/0292334 A1* | 10/2015 | Mongillo, Jr. | F01D 5/20 416/97 R |
| 2016/0001404 A1 | 1/2016 | Mierzejewski et al. | |
| 2016/0375610 A1 | 12/2016 | Vollebregt et al. | |
| 2017/0167275 A1* | 6/2017 | Schroeder | F01D 5/20 |
| 2017/0328222 A1 | 11/2017 | Coyez et al. | |
| 2017/0350255 A1 | 12/2017 | Couture et al. | |
| 2019/0022743 A1 | 1/2019 | Rollinger et al. | |
| 2019/0099803 A1 | 4/2019 | Huchin et al. | |

FOREIGN PATENT DOCUMENTS

| | | |
|---|---|---|
| WO | 0131171 A1 | 5/2001 |
| WO | 2018143997 A1 | 8/2018 |

OTHER PUBLICATIONS

Partial European Search Report for European Application No. 20182444.8, International Filing Date Jun. 26, 2020, dated Sep. 4, 2020, 15 pages.

Extended European Search Report for European Application No. 20182441.4, International Filing Date Jun. 26, 2020, dated Dec. 9, 2020, 12 pages.

Extended European Search Report for European Application No. 20182444.8, International Filing Date Jun. 26, 2020, dated Dec. 11, 2020, 12 pages.

* cited by examiner

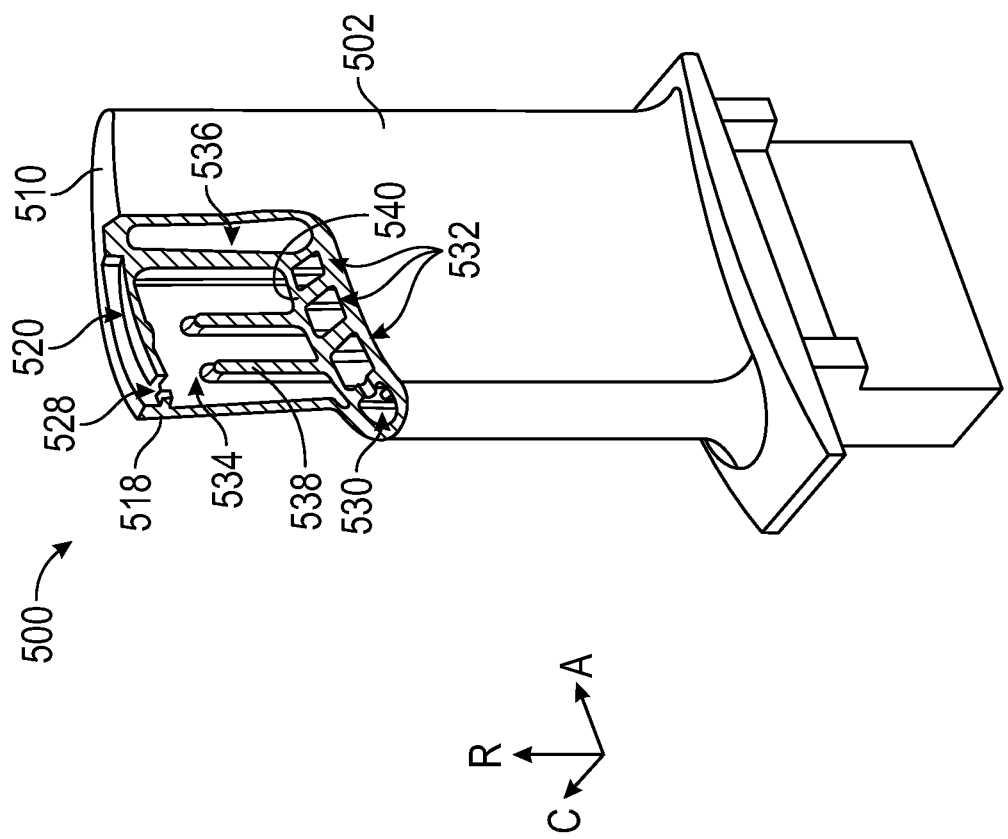
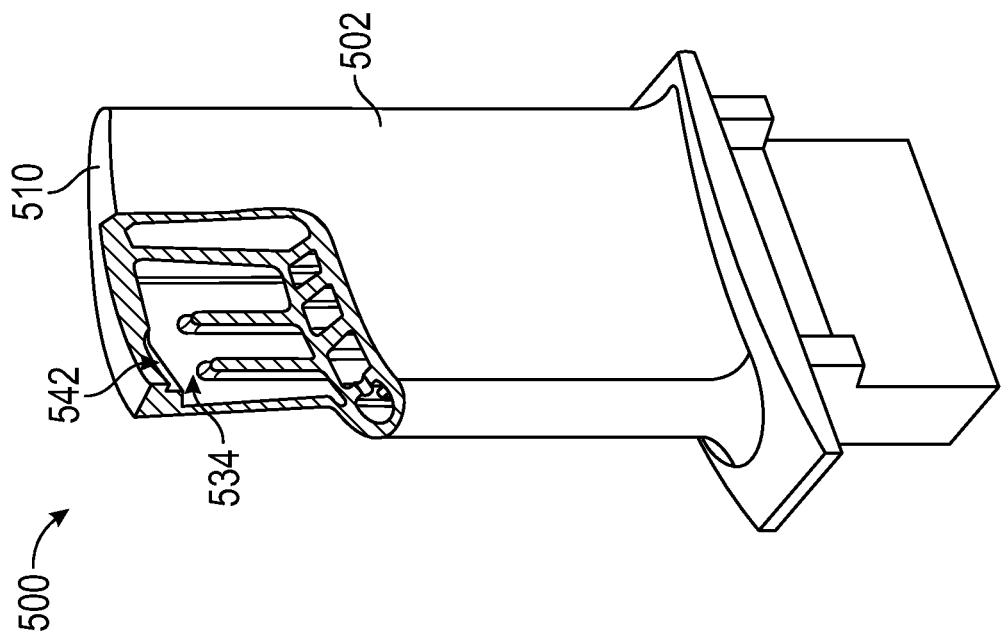

AIRFOILS AND CORE ASSEMBLIES FOR GAS TURBINE ENGINES AND METHODS OF MANUFACTURE

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external sidewalls and/or internal to the airfoil. Such cooling cavities are subject to both hot material walls (exterior or external) and cold material walls (interior or internal). Further, different cooling schemes may be necessary for blades and vanes due to operational parameters, environment, and/or conditions. Although such cavities are designed for cooling portions of airfoil bodies, improved cooling designs may be desirable.

BRIEF DESCRIPTION

According to some embodiments, methods for forming airfoils for gas turbine engines are provided. The methods include forming an airfoil body about a core assembly configured to define one or more internal cavities of the airfoil body, the core assembly comprising at least core structure having a purge slot protrusion extending from a portion of the core structure, removing the core assembly from the airfoil body to form one or more internal cavities, wherein at least one internal cavity has a cavity extension define by the purge slot protrusion, and forming a squealer pocket in a tip of the formed airfoil body, wherein a cavity purge slot is formed at the cavity extension to fluidly connect the respect internal cavity with the squealer pocket.

In addition to one or more of the features described above, or as an alternative, further embodiments of the methods may include that at least one of the squealer pocket and the cavity purge slot are formed by an electrode discharge machining process.

In addition to one or more of the features described above, or as an alternative, further embodiments of the methods may include that the electrode discharge machining process comprises using an electrode having an electrode extension arranged to form the cavity purge slot.

In addition to one or more of the features described above, or as an alternative, further embodiments of the methods may include that the electrode and the electrode extension are a monolithic piece.

In addition to one or more of the features described above, or as an alternative, further embodiments of the methods may include that the core assembly comprises a plurality of core structures including a pressure side core structure and a suction side core structure, wherein the pressure side core structure defines a pressure side cavity in the formed airfoil body and the suction side core structure forms a suction side cavity in the formed airfoil, wherein the purge slot protrusion is on the suction side core.

In addition to one or more of the features described above, or as an alternative, further embodiments of the methods may include that the core assembly further comprises a leading edge core structure and a trailing edge core structure.

In addition to one or more of the features described above, or as an alternative, further embodiments of the methods may include forming at least one purge hole connecting the formed pressure side cavity by at least one of a purge hole rod and drilling.

In addition to one or more of the features described above, or as an alternative, further embodiments of the methods may include that the core structure having the purge slot protrusion has a dimension in a direction from a pressure side to a suction side of the formed airfoil of about 0.075 inches or less.

According to some embodiments, core assemblies for formation of airfoils for gas turbine engines are provided. The core assemblies include a core structure configured to define an internal cavity of an airfoil, the core structure extending from a base to a tip and a purge slot protrusion extending from a portion of the core structure proximate the tip, the purge slot protrusion configured to form a cavity extension in the formed airfoil.

In addition to one or more of the features described above, or as an alternative, further embodiments of the core assemblies may include that the core structure having the purge slot protrusion has a dimension in a direction from a pressure side to a suction side of the formed airfoil of about 0.075 inches or less.

In addition to one or more of the features described above, or as an alternative, further embodiments of the core assemblies may include that the core assembly comprises a plurality of core structures including a pressure side core structure and a suction side core structure, wherein the pressure side core structure defines a pressure side cavity in the formed airfoil body and the suction side core structure forms a suction side cavity in the formed airfoil, wherein the purge slot protrusion is on the suction side core.

In addition to one or more of the features described above, or as an alternative, further embodiments of the core assemblies may include that the core assembly further comprises a leading edge core structure and a trailing edge core structure.

In addition to one or more of the features described above, or as an alternative, further embodiments of the core assemblies may include that the pressure side core structure defines a serpentine structure configured to form a serpentine flow path within a formed airfoil.

In addition to one or more of the features described above, or as an alternative, further embodiments of the core assemblies may include that the pressure side core structure includes one or more purge hole rods configured to form purge holes in a formed airfoil.

According to some embodiments, airfoils for gas turbine engines are provided. The airfoils include an airfoil body extending between a base and a tip, the airfoil body having an internal cooling cavity having a cavity extension located proximate the tip, a squealer pocket formed in the tip of the airfoil body, the squealer pocket having a pocket base that is recessed from the tip and extends toward the cavity extension, a recess formed in the squealer pocket and extending away from the tip toward the cavity extension, and a cavity purge slot forming an aperture to fluidly connect the internal cooling cavity to the squealer pocket through the recess.

In addition to one or more of the features described above, or as an alternative, further embodiments of the airfoils may include that the internal cooling cavity has a dimension in a direction from a pressure side to a suction side of the airfoil body of about 0.075 inches or less.

In addition to one or more of the features described above, or as an alternative, further embodiments of the airfoils may include that the airfoil body includes at least one additional internal cooling cavity, wherein at least one additional internal cooling cavity includes at least a pressure side cavity and the internal cooling cavity having the cavity extension is a suction side cavity.

In addition to one or more of the features described above, or as an alternative, further embodiments of the airfoils may include that the at last one additional internal cavity further includes a leading edge cavity and a trailing edge cavity.

In addition to one or more of the features described above, or as an alternative, further embodiments of the airfoils may include that the pressure side cavity defines a serpentine flow path within the airfoil body.

In addition to one or more of the features described above, or as an alternative, further embodiments of the airfoils may include that the pressure side cavity includes one or more purge holes fluidly connecting the pressure side cavity to the squealer pocket.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

FIG. 5A is a schematic partial cut-away illustration of an airfoil during a part of a manufacturing process thereof;

FIG. 5B is a schematic partial cut-away illustration of the airfoil of FIG. 5A during a subsequent part of the manufacturing process thereof;

DETAILED DESCRIPTION

Detailed descriptions of one or more embodiments of the disclosed apparatus and/or methods are presented herein by way of exemplification and not limitation with reference to the Figures.

Figure 1:
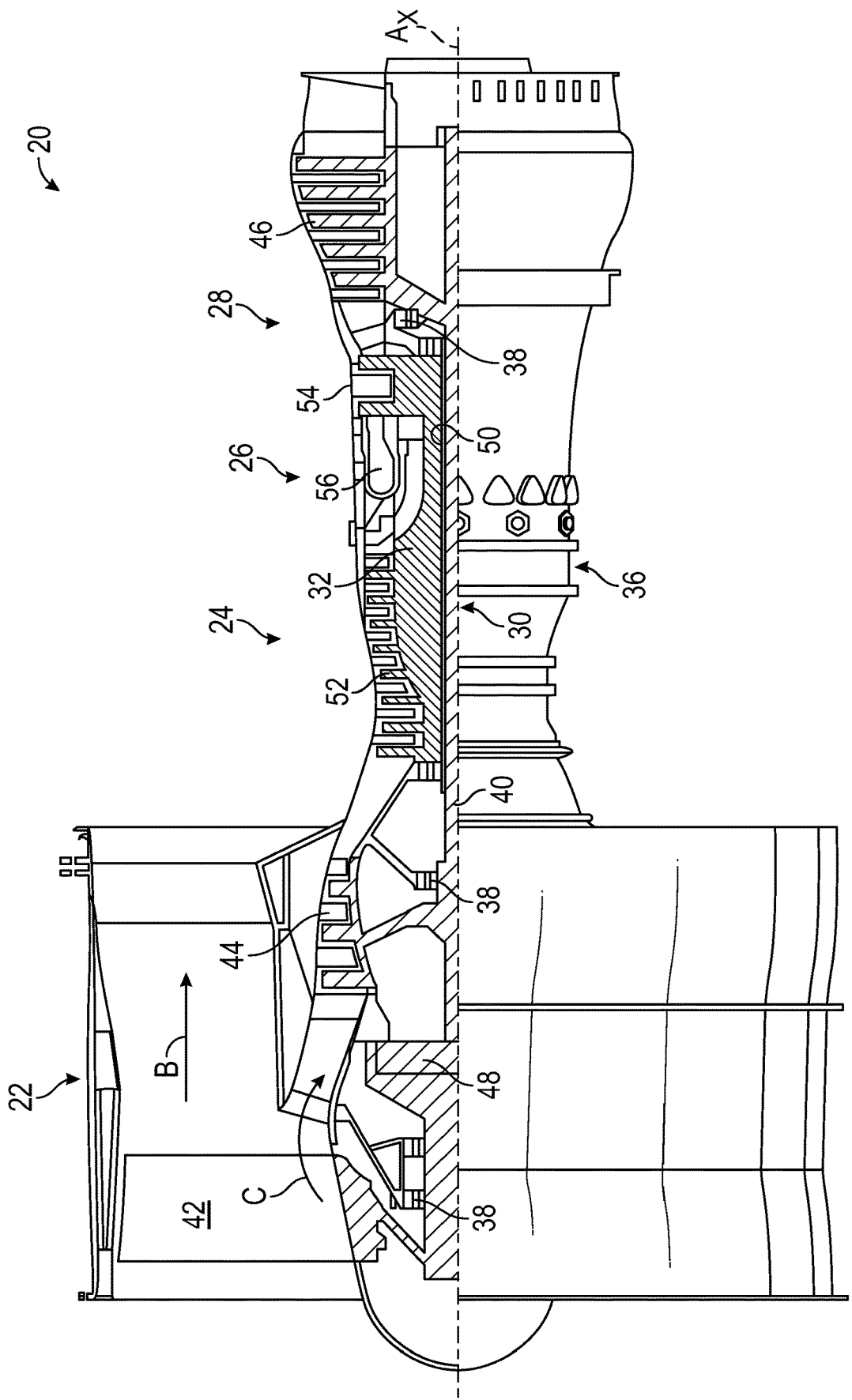
FIG. 1 is a schematic cross-sectional illustration of a gas turbine engine that can incorporate embodiments of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis $A_x$ relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis $A_x$ which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(514.7°R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
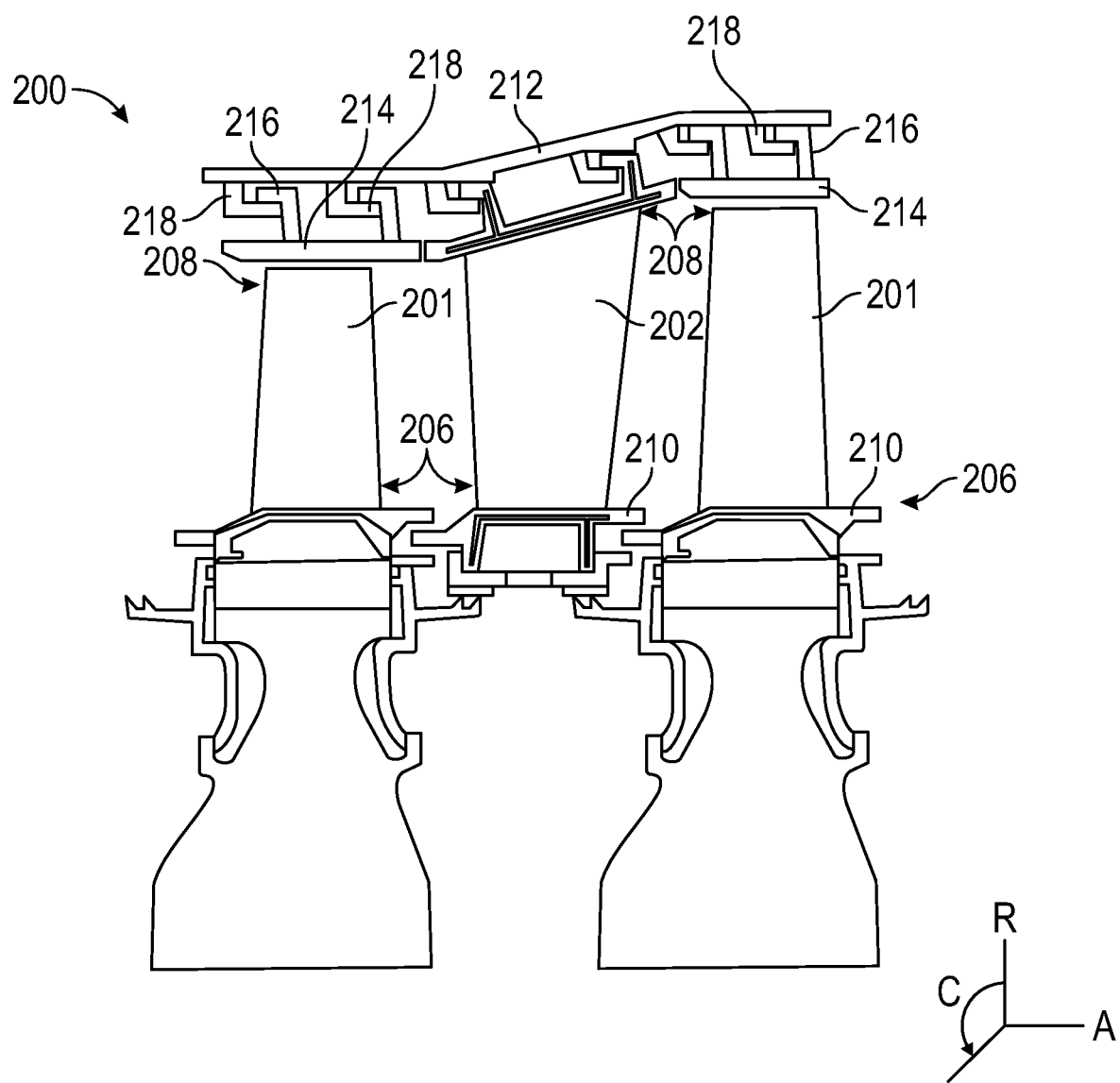
FIG. 2 is a schematic illustration of a portion of a turbine section of a gas turbine engine that can incorporate embodiments of the present disclosure.

FIG. 2 is a schematic view of a portion of a turbine section 200 that may employ various embodiments disclosed herein. The turbine section 200 includes a plurality of airfoils, including, for example, one or more blades 201 and vanes 202. The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions or internal walls or structures within the airfoils 201, 202 that may extend either from the inner diameter 206 or the outer diameter 208 of the airfoil 201, 202, or as partial sections therebetween. The partitions may extend for a portion of the length of the airfoil 201, 202, but may stop or end prior to forming a complete wall within the airfoil 201, 202. Multiple of the airfoil cavities may be fluidly connected and form a fluid path within the respective airfoil 201, 202. The blades 201 and the vanes 202, as shown, are airfoils that extend from platforms 210 located proximal to the inner diameter thereof. Located below the platforms 210 may be airflow ports and/or bleed orifices that enable air to bleed from the internal cavities of the airfoils 201, 202. A root of the airfoil may connect to or be part of the platform 210. Such roots may enable connection to a turbine disc, as will be appreciated by those of skill in the art.

The turbine 200 is housed within a case 212, which may have multiple parts (e.g., turbine case, diffuser case, etc.). In various locations, components, such as seals, may be positioned between the airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201. Similarly, other hooks, as illustratively shown, are arranged to support the vane 202 within the case 212.

As shown and labeled in FIG. 2, a radial direction R is upward on the page (e.g., radial with respect to an engine axis, such as engine central longitudinal axis $A_x$ shown in FIG. 1) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Cooling of the airfoils 201, 202 may be achieved through internal cavities, as will be appreciated by those of skill in the art. Cooling air may be passed into and through the internal cavities, with the cooling air providing heat pick-up to remove heat from the hot material surfaces of the airfoil (e.g., external surfaces exposed to the hot gaspath).

During operation, turbine engines ingest dirt, other particulates, debris, and other particles. Such particles may travel through the hot gaspath (i.e., through the compression and combustor systems) and may flow into the internal structures (i.e., cooling cavities) of the blades where the particles (along with the cooling air) is flung or pumped to the outer diameter or tips of the blades. The majority of these particles are extremely fine grain in size and can flow within the cooling air streams that are used to cool the internals of the blades. However, in some cases, the particles may be too large to make abrupt turns inside the turbine blade internal passages, such as through serpentine cooling flows. These larger particles may adhere to the outer most surfaces of the blade internals (i.e., on the internal cavity surfaces at the tip of the blade). This accumulation of dirt can cause various issues, including, but not limited to, premature metallurgical degradation, unwanted insulated areas within the airfoil, and increase the tip pull of the part. Such issues may result in, for example, decreased cooling efficiencies, reduced structural integrity of the blade at the root and disk lugs, reduced part life, and altered structural and vibration responses of the blade.

Therefore, it is common practice to have at least one relatively large hole at the tip of the blade which allows entrained larger dirt particles to escape out of the blade into the gas path and out the back of the engine. That is, at one or more locations at the tip of the blade, a hole of sufficient size may be provided to fluidly connect the internal cavities with the external air (i.e., gas path) at the tip, and thus allow the relatively larger particles to exit the internal cavities. These holes are typically cast using alumina or quartz rods, drilled using electrodes or lasers, or are part of the trailing edge exit circuitry.

In some configurations, the purge holes may be formed within a pocket or recess formed in the tip of the airfoil (e.g., tip pocket, a squealer pocket, squealer tip pocket, and/or tip shelf). The squealer pocket is configured to allow for air within the airfoil to exit into the gaspath without causing substantial inefficiencies in airflow. That is, air can exit internal cavities of the airfoil into the squealer pocket and align to flow while minimizing flow losses. Further, a portion of the air that exits the internal cavities may enter and remain within the tip pocket, at least for some amount of time, an provide cooling of the walls and base of the tip pocket, which can increase serviceable life of the tip of the airfoil.

During manufacture, for example, traditional methods use cast-in rods to create a dirt purge hole at the tip. Such rods may connect a squealer pocket core to an internal cavity core in a core assembly to form the airfoil (although in some configurations the squealer pocket may be machined). The rods require that there be sufficient core material surrounding the rod to ensure that the rod can be held in place during the casting process. The core material is the material that defines the shape, volume, and dimensions of a cavity within a formed airfoil. That is, the core material is the negative of the cooling cavity, with the airfoil body material cast around the core. Because of this, a minimum thickness or dimension must be present in the core to support the rod. For example, in typical casting operations, a minimum thickness of the core must be on the order of about 0.1 inches (about 2.54 mm) plus the diameter of the rod. Typical dirt purge holes may have a diameter of about 0.015-0.025 inches (about 0.381-0.635 mm). As such, a circumferential thickness (i.e., a direction from pressure side to suction side of a formed airfoil), being the typical shortest dimension of a cooling cavity, may be constrained or limited by these requirements associated with rod installation for formation of tip purge holes. That is, a minimum dimension of the cavity core (and thus cavity) may be dictated by the requirements of purging the cavity to prevent particle accumulation.

An alternative method of forming such tip purge holes is to form holes into the tip using an electrode (e.g., electrode discharge machining). Such methods require that the core be at least 0.060 inches (1.524 mm) thick. However, even with this minimum thickness, there may still be a risk of scarfing the internal passages when forming the holes, thus impacting the internal cooling scheme and structural integrity of the formed airfoil.

Even in view of the above, there is a desire to form airfoils having cavity geometries with thinner thicknesses (i.e., less than 0.060 inches (1.524 mm) thick). Embodiments of the present disclosure are directed to cores, core assemblies, and formed airfoils having cooling cavities with dimensions lower than the prior minimums. Embodiments of the present disclosure are directed to, in part, airfoil cavity core bodies that include an extension from a tip region to form a purge hole in the tip of a formed airfoil. That is, rather than using a rod or an electro to form holes, the tip purge holes may be formed using an integral structure of the cavity core bodies (e.g., a core extension) that is subsequently machined (e.g., by electrode discharge machining ("EDM")).

Tolerances between the tip and any machined tip pocket are such that any protrusion from the core that is of a dirt purge hole diameter (0.015-0.025 inches) or size would need to be relatively tall (about 0.070-0.120 inches (about 1.778-3.048 mm)) and thin, which would be relatively delicate and increase scrap rate of components. As such, embodiments of the present disclosure are directed to core protrusions and geometries thereof that may work with cores that are thinner than that which can accept rods or hole drill and still form a particle tip purge hole.

Such thin cores are formed with a lengthwise (from tip to trailing edge, i.e., substantially axial direction with respect to an engine axis when installed therein) protrusion that is the width of the desired purge hole. The axial length of the core protrusion may be sized to take into account the desired axial length of the purge hole and any core shift and profile tolerances in addition to any machined tip pocket tolerances. During the manufacturing process, a tip-pocket electrode may include a crosswise bar or protrusion on an inner diameter that plunges deeper than the bottom of the formed pocket and intersects with the integrally formed protrusion for the desired length of the purge hole.

Figure 3A:
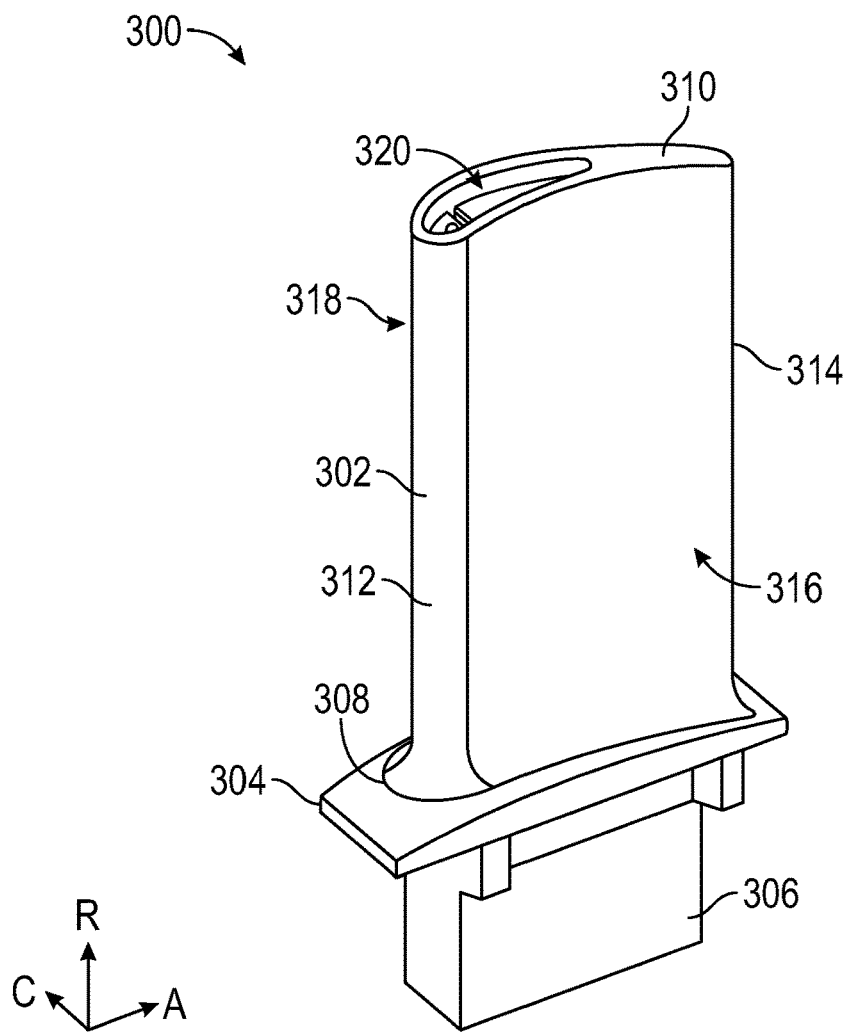
FIG. 3A is an isometric elevation schematic illustration of an airfoil in accordance with an embodiment of the present disclosure.
Figure 3B:
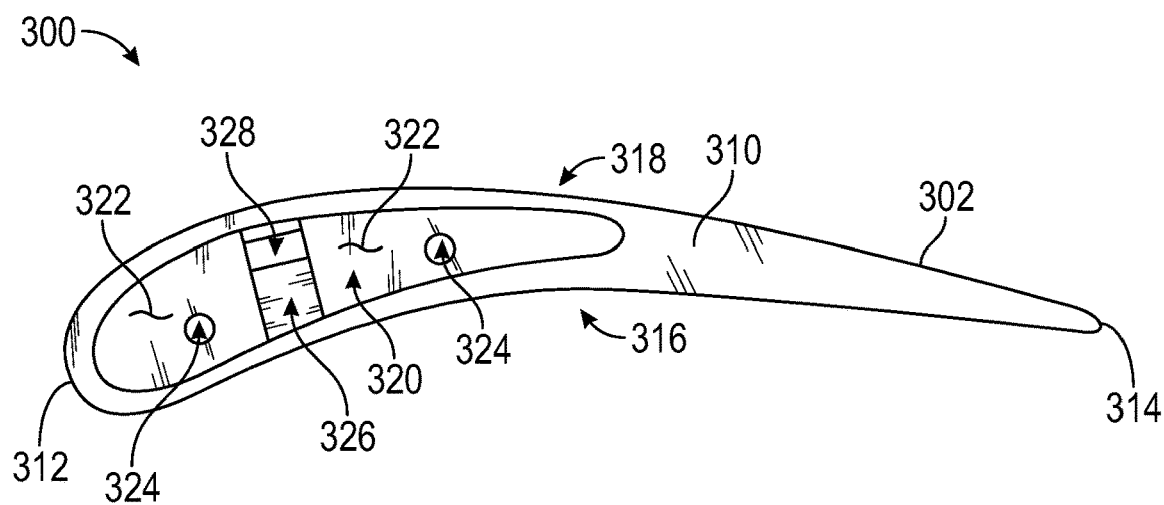
FIG. 3B is a top down plan view illustration of the airfoil of FIG. 3A.

Turning now to FIGS. 3A-3B, schematic illustrations of an airfoil 300 in accordance with an embodiment of the present disclosure is shown. The airfoil 300 includes an airfoil body 302 that extends in a radial direction from a platform 304. An attachment mechanism 306 extends from an opposing side of the platform 304 from the airfoil body 302 and is configured to enable engagement with a disk of a gas turbine engine. The airfoil 300, in this illustrative configuration, is a blade for use with a compressor or turbine section of a gas turbine engine. FIG. 3A is an isometric elevation view of the airfoil 300 and FIG. 3B is a top down illustration of the airfoil 300.

The airfoil body 302 extends between a base 308 at the platform 304 and a tip 310, in a radial direction R. In an axial direction A, the airfoil body 302 extends between a leading edge 312 and a trailing edge 314. In a circumferential direction C, the airfoil body 302 extends between a pressure side 316 and a suction side 318. The directions described herein are relative to an engine axis (e.g., engine central longitudinal axis $A_x$ shown in FIG. 1).

The airfoil body 302 may include one or more internal cooling cavities, as will be appreciated by those of skill in the art. The cooling cavities can include conventional cavities or hybrid or skin core cavities. Conventional cavities are cavities that are defined between external hot walls of the airfoil, such as from the pressure side 316 to the suction side 318 in the circumference direction C. As such, a conventional cooling cavity provides cooling to two hot walls of the airfoil body. A hybrid or skin core cavity is one that is defined between an external hot wall of the airfoil body and an internal cold wall (a wall that is not exposed to hot external gases). The hybrid or skin core cavities have low height (i.e., circumferential direction C) to width (i.e., axial direction A) aspect ratios, with a flow direction being normal to the height and width (i.e., radial direction R). That is, the hybrid or skin core cavities has thin thicknesses in a direction from the pressure side 316 to the suction side 318 (i.e., less than full thickness of internal size of the airfoil boy), whereas a conventional cavity would have a full thickness from the pressure side 316 to the suction side 318 (two hot walls).

At the tip 310 of the airfoil 300 is a squealer pocket 320. As discussed above, the squealer pocket 320 can provide a volume for air exiting the internal cavities of the airfoil 300 to align and flow together before entering a hot gaspath, and thus reduce losses associated with such merging of flows. As such, the squealer pocket 320 may include one or more apertures that fluidly connect the squealer pocket 320 to the internal cavities of the airfoil 300.

FIG. 3B illustrates a top down view of the tip 310 and the squealer pocket 320. The squealer pocket 320 is defined by a pocket base 322 and walls of the airfoil body 302. The pocket base 322 is recessed relative to the tip 310. In this illustrative configuration, the squealer pocket 320 includes two main body cavity purge holes 324. The main body cavity purge holes 324 may fluidly connect to one or more main body cavities within the airfoil body 302. For example, in one non-limiting example, the main body cavity purge holes 324 may be fluidly connected at two distinct locations along a serpentine cavity arranged along the pressure side 316 of the airfoil body 302. The pocket base 322 further includes a recess 326 formed within the squealer pocket 320 and extending radially inward from the pocket base 322. The recess 326 may be a cut out or removal of material in the pocket base 322 to form a channel that extends radially inward from the pocket base 322 and exposes or forms a cavity purge slot 328. The cavity purge slot 328 may form a fluid connection between an internal cavity of the airfoil body 302 and the squealer pocket 320.

In this illustrative embodiment, the main body cavity purge holes 324 may be formed by drilling or rods during a casting process. The main body cavity purge holes 324 may connected to conventional cavities or to skin core cavities. However, as noted above, the core used to form the conventional cavities or skin core cavities must be of sufficient dimensions to accommodate the rods or drilling operation. In contrast, the cavity purge slot 328 is formed to connect to a cavity having dimensions that does not permit the use of rods or drilling. That is, the cavity to which the cavity purge slot 328 connects may have a thickness in a direction between the pressure side 316 and the suction side 318 that does not allow for rods or drilling for forming purge holes. For example, the cavity may have a thickness in the direction between the pressure side 316 and the suction side 318 of 0.060 inches (1.524 mm) or less.

To form the cavity purge slot 328 in the recess 326, an electrode discharge machining ("EDM") process may be employed. The EDM process may be used to cut into a formed airfoil body and thus form the squealer pocket 320 in the tip 310 of the airfoil 300. The removal of material during the EDM process employs an electrode having a desired geometry to form the squealer pocket 320, the recess 326, and the cavity purge slot 328. To achieve this, the internal cavities (and particularly the cavity to have the cavity purge slot 328) are formed with specific geometries and/or features to enable the airfoil 300 to be formed.

Figure 4:
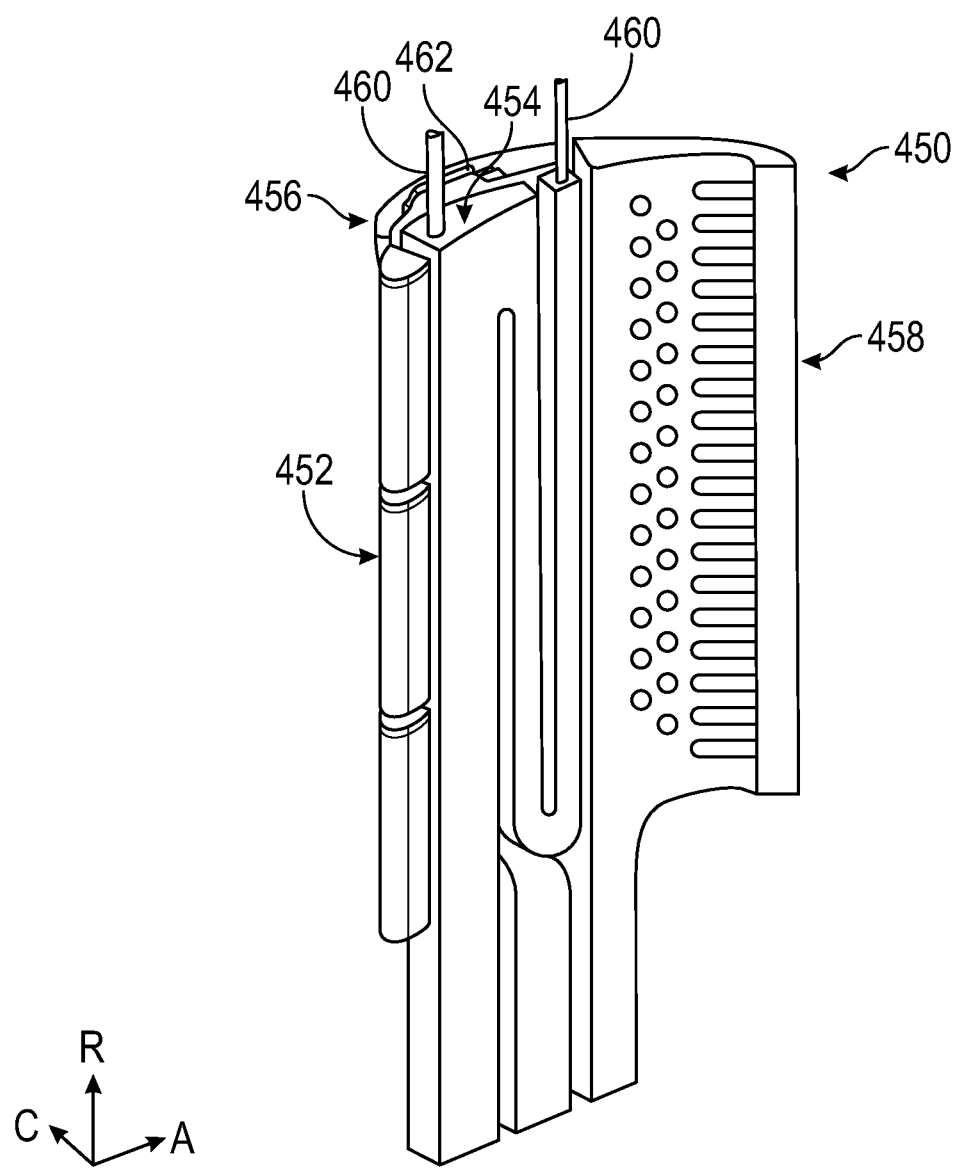
FIG. 4 is a schematic illustration of a core assembly in accordance with an embodiment of the present disclosure.

Turning now to FIG. 4, a schematic illustration of a core assembly 450 in accordance with an embodiment of the present disclosure is shown. The core assembly 450 may be used during a manufacturing process for forming an airfoil, such as that shown and described with respect to FIGS. 3A-3B. The core assembly 450 comprises a number of different cores that are arranged to define internal cavities within a formed airfoil. Accordingly, the core assembly 450 is formed of a material that may be removed after being cast within material of the airfoil body, as will be appreciated by those of skill in the art.

As shown, the core assembly 450 includes a leading edge core structure 452, a pressure side core structure 454, a suction side core structure 456, and a trailing edge core structure 458. The core structures 452, 454, 456, 458 each define separate internal cavities in a formed airfoil and may be fluidly separated or may be fluidly connected. In the core assembly 450, core structures may be connected by rods or other structures to form fluidly connections in a formed airfoil, as will be appreciated by those of skill in the art.

In this illustrative embodiment, the leading edge core structure 452 includes a plurality of separate sections and may be arranged to form a plurality of respective impingement cavities along the leading edge of the formed airfoil. The pressure side core structure 454 is arranged as a serpentine cavity that includes one or more purge hole rods 460 that are arranged proximate the tip or top of the pressure side core structure 454. The purge hole rods 460 are configured to be removed during or after manufacture of an airfoil body, and when removed will define or form purge holes located at the tip of the formed airfoil body. The purge hole rods 460 may be used because a thickness of the pressure side core structure 454 permits the use of such purge hole rods 460.

In contrast, as shown, the suction side core structure 456 may be relative thin in comparison to the pressure side core structure 454 and may not be able to accommodate the use of purge hole rods. To enable the formation of a purge aperture, the suction side core structure 456 includes a purge slot protrusion 462. The purge slot protrusion 462 is an extension of the material of the suction side core structure 456 and may be removed during the manufacturing process of an airfoil body to thus form a radially outward (direction toward the tip of the formed airfoil) extension of a formed cavity on the suction side. This cavity extension enables a cutting or removal process of airfoil material to form a cavity purge slot in a formed airfoil (e.g., cavity purge slot 328 shown in FIG. 3B).

The purge slot protrusion 462 has a length (axial direction A) that is sufficient to ensure that a desired cavity purge slot can be formed after casting of an airfoil body. The length of the purge slot protrusion 462 in the axial direction A may be sized to take into account the desired axial length of the formed cavity purge slot and accommodate any core shift and/or profile tolerances in addition to any machined tip pocket (i.e., squealer pocket) tolerances). The width of the purge slot protrusion 462 in a circumference direction C (i.e., direction from pressure side to suction side) is configured to be a width of the formed cavity purge slot and allows for the formation of a wall to define a portion of a squealer pocket. The purge slot protrusion 462 may have a height in a radial direction R that is sufficient to enable formation of the cavity purge slot while also allowing for formation of a pocket base of a squealer pocket at locations other than the cavity purge slot (and the purge hole rods 460).

Turning now to FIGS. 5A-5B, schematic illustrations of an airfoil 500 in accordance with an embodiment of the present disclosure are shown. FIG. 5A illustrates an airfoil body 502 after a manufacturing process using a core assembly, such as shown and described with respect to FIG. 4, prior to formation of a squealer pocket, and FIG. 5B illustrates the airfoil body 502 with a formed squealer pocket 520 and formed cavity purge slot 528. The airfoil body 502 includes a plurality of internal cavities formed therein, which may be formed by removal of core assembly material after casting of the airfoil body 502, as will be appreciated by those of skill in the art.

As shown, in this embodiment, the airfoil body 502 includes a leading edge cavity 530, a pressure side cavity 532, a suction side cavity 534, and a trailing edge cavity 536. The pressure side cavity 532 may be a serpentine flow cavity that is fluidly connected to the leading edge cavity 530 through one or more impingement holes, as will be appreciated by those of skill in the art. The suction side cavity 534 may comprise a set of one or more radially extending channels that may be separated by radially extending ribs 538. The radially extending ribs 538 may extend between a core rib 540 that separates the pressure side cavity 532 from the suction side cavity 534 and a suction side 518 of the airfoil body 502.

Proximate a tip 510 of the airfoil body 502, the suction side cavity 534 is formed with a cavity extension 542 that extends in a radial direction R toward the tip 510. As such, the suction side cavity 534 includes a portion (the cavity extension 542) that extends radially closer to the tip 510 than the rest of the suction side cavity 534 (or other internal cavities of the airfoil body 502).

After formation of the airfoil body 502, using a core assembly, a portion of the airfoil body 502 may be further treated or worked to form additional features on the airfoil 500. For example, an EDM process can use an electrode to cut into and remove material of the airfoil body 502 from the tip 510. In one such operation, the EDM process may be used to remove material from the tip 510 to form a squealer pocket 520 therein. The electrode of the EDM process may include an electrode extension that is used to cut deeper into the material of the airfoil body 502 and remove a portion of the material at the cavity extension 542, thus forming the cavity purge slot 528 which fluidly connects the suction side cavity 534 with the squealer pocket 520.

Figure 6A:
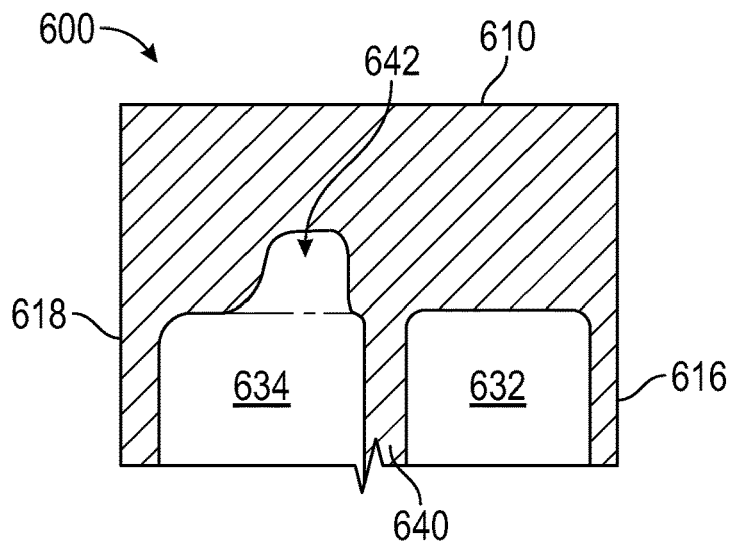
FIG. 6A is a schematic partial cross-sectional illustration of an airfoil during a part of a manufacturing process thereof.
Figure 6B:
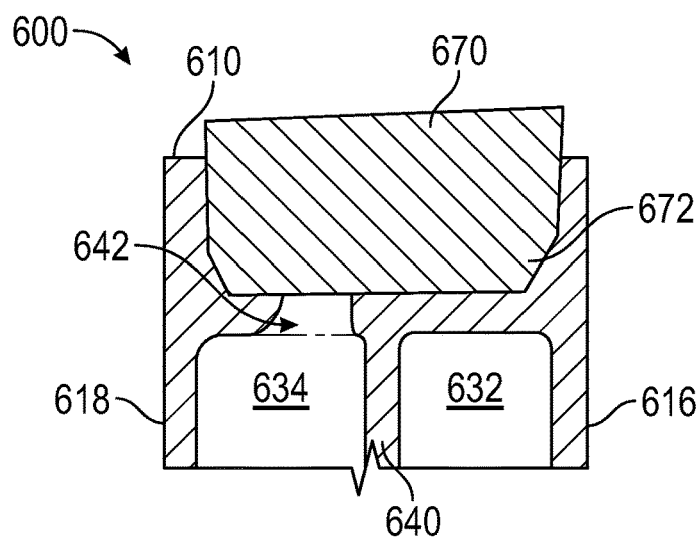
FIG. 6B is a schematic partial cross-sectional illustration of the airfoil of FIG. 6A during a subsequent part of the manufacturing process thereof.
Figure 6C:
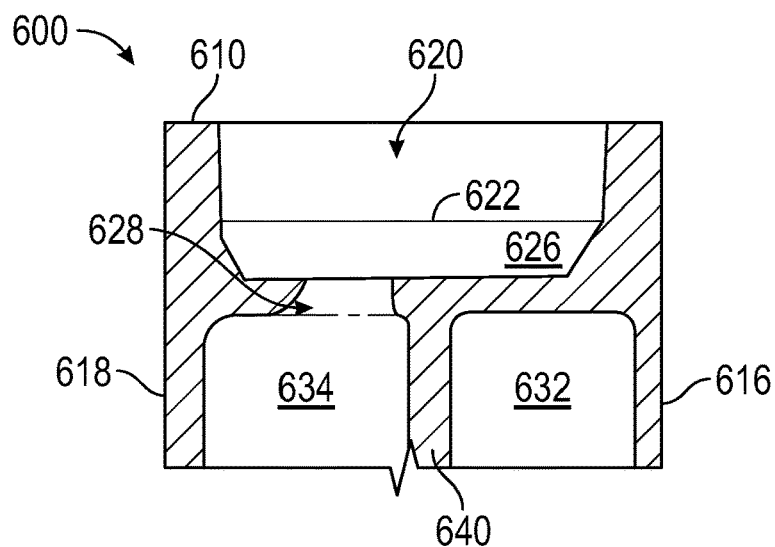
FIG. 6C is a schematic partial cross-sectional illustration of the airfoil of FIG. 6A during a subsequent part of the manufacturing process thereof after the part shown in FIG. 6B.

Turning now to FIGS. 6A-6C, schematic illustrations of part of a manufacturing process for forming an airfoil 600 in accordance with an embodiment of the present disclosure are shown. The airfoil 600 may be similar to that shown and described above, and may be formed using a core assembly, as described above. The airfoil 600, as shown, illustrates a tip 610, a pressure side 616, a suction side 618, an internal pressure side cavity 632, and an internal suction side cavity 634. The pressure side cavity 632 is separated from the suction side cavity 634 by a core rib 640 that extends from a base to a tip of the airfoil 600.

FIG. 6A illustrates the airfoil 600 prior to formation of a squealer pocket 620 (shown in FIG. 6C). In this illustration, the suction side cavity 634 includes a cavity extension 642 that extends closer to the tip 610 than the rest of the suction side cavity 634 (and closer than the pressure side cavity 632).

FIG. 6B illustrates an electrode 670 extending into the material of the airfoil 600 to remove material at the tip 610 to form the squealer pocket 620. The electrode 670 is sized and shaped to form the squealer pocket 620 having a pocket base 622 extending between the pressure side 616 and the suction side 618 at a depth below the tip 610. The electrode 670 further includes an electrode extension 672 that extends deeper into the material of the airfoil and contacts or connects with the cavity extension 642. The electrode extension 672 is configured to form a recess 626 (shown in FIG. 6C) that extends radially inward (or away from the tip) farther than the pocket base 622.

When the electrode 670 is removed, the suction side cavity 634 is fluidly connected to the squealer pocket 620 through a cavity purge slot 628 (formerly the cavity extension 642) and the recess 626, as shown in FIG. 6C. The pressure side cavity 632 may be fluidly connected to the squealer pocket 620 through one or more cavity purge holes formed using rods (not shown), as described above.

Turning to FIGS. 7A-7D, schematic illustrations of parts of a manufacturing process of an airfoil 780 in accordance with an embodiment of the present disclosure are shown. In this embodiment, the airfoil 780 is formed using a single core structure 781 having a purge slot protrusion 782. The core structure 781 of this embodiment may be arranged to form a conventional internal airfoil cooling cavity 783 (i.e., extending between two hot external walls, i.e., pressure side and suction side). That is, a single, relatively thin airfoil 780 may be formed with the single internal cooling cavity 783 defined therein.

Figure 7A:
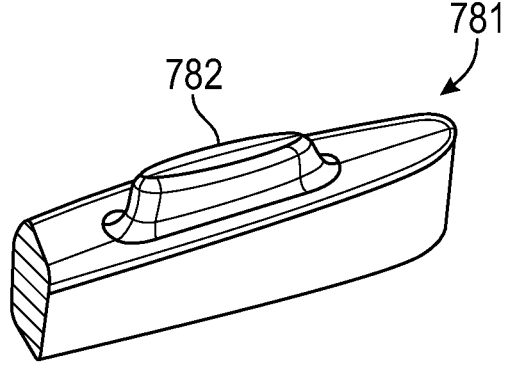
FIG. 7A is a schematic illustration of a portion of a core structure in accordance with an embodiment of the present disclosure.
Figure 7B:
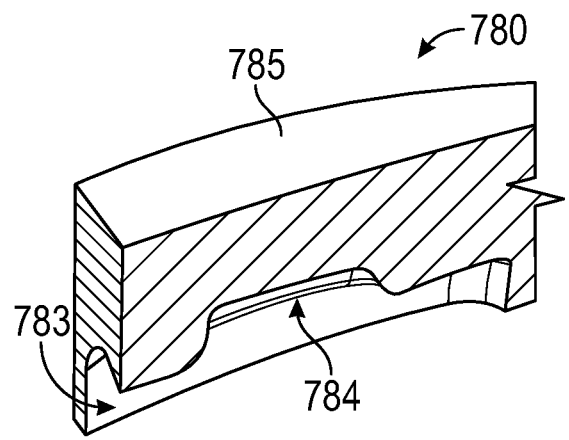
FIG. 7B is a schematic illustration of a portion of an airfoil formed using the core structure of FIG. 7A.
Figure 7C:
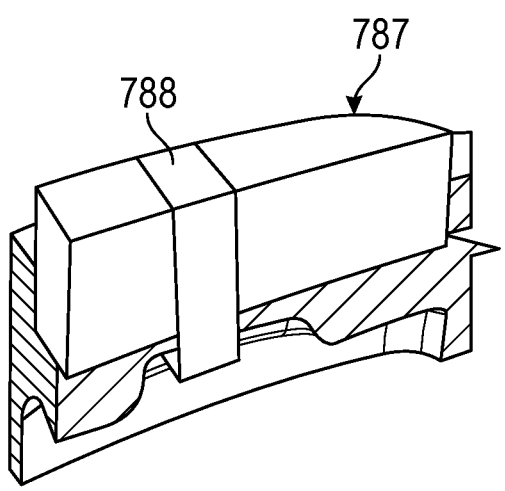
FIG. 7C is a schematic illustration of a part of a machining process being performed on the airfoil of FIG. 7B.
Figure 7D:
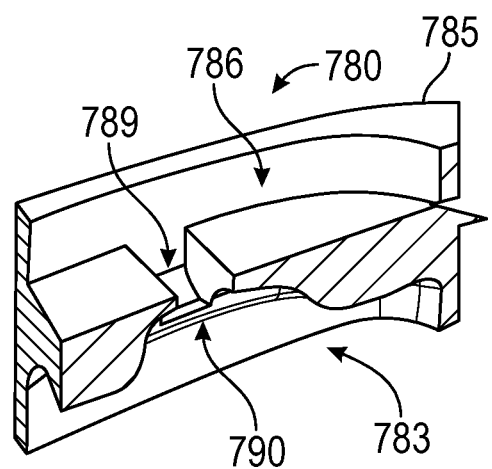
FIG. 7D is a partial schematic illustration of the formed airfoil of FIG. 7A after the machining performed in FIG. 7C.

The core structure 781 is used for casting material of the formed airfoil 780, and thus formation of a cavity extension 784 is formed by the purge slot protrusion 782. This configuration may be employed because a width (or other dimensions) of the core structure 781 may be too small to accommodate the use of rods for forming purge holes. As shown in FIG. 7B, the airfoil 780 is formed with a tip 785. It may be desirable to form a squealer pocket 786 (shown in FIG. 7D) in order to allow for desired cooling flow exiting from the internal cooling cavity 783 into a hot gas path during operation.

To form the squealer pocket 786 within the tip 785, an electrode 787 may be used after casting of the airfoil 780. The electrode 787 may be sized and shaped to remove material at the tip 785 of the airfoil 780 such that the squealer pocket 786 may be formed in the tip 785 of the airfoil 780. The electrode 787 includes an electrode extension 788 that cuts into the material of the airfoil 780 deeper than the rest of the electrode 787. As such, during formation of the squealer pocket 786, the electrode extension 788 may cut a recess 789 that extends sufficiently to cut into the cavity extension 784 to form a cavity purge slot 790 that provides for fluid communication from the internal cavity 783 and the squealer pocket 786.

In accordance with embodiments of the present disclosure, in view of the teachings herein, those of skill in the art will appreciate that the configurations employed a cavity purge slot (as compared to cavity purge holes) may be used for any cavity of an airfoil, and is not limited to suction side cavities and/or single internal cavities. For example, similar purge slot protrusions may be formed on any given core structure or portion thereof to allow for a cavity purge slot to be formed. Accordingly, in some embodiments, a pressure side cavity may include a purge slot protrusion at a location that may be too thin to accommodate a purge hole rod. Similarly, a leading edge core structure and/or trailing edge core structure may include such protrusions, if a tip purge is desired for such cavities.

The electrode used in EDM processes described herein can be made up of multiple pieces or can be a monolithic electrode having the required geometry. Further, the specific location of the core protrusions, cavity extensions, and/or electrode extensions may be selected to form a cavity purge slot at a desired location and having desired features (dimensions, geometry, etc.) to provide appropriate purging capability for a given cavity. As noted above, the core protrusions described herein, used to form cavity purge slots, may be employed on core structures having minimum dimensions that are insufficient to support rods and/or allow for drilling to form purge holes, as typically done for relatively larger core structures and formed cavities. For example, the core protrusions may be used on core structures having a smallest dimension, at the location of the desired purging, of about 0.075 inches (1.905 mm) or less. Typically such dimension will be in a circumferential direction (i.e., a direction between a pressure side and suction side of a formed airfoil). Further, such core protrusions may be used on hybrid skin cores (i.e., cores used to form skin core cavities having a hot side defined by an external hot wall of an airfoil and an internal cold wall). It will be appreciated that an external hot wall of an airfoil is an external surface that is exposed to a gaspath during operation, and an internal cold wall refers to an internal structure of an airfoil that is not exposed directly to hot gaspath air during operation.

Figure 8:
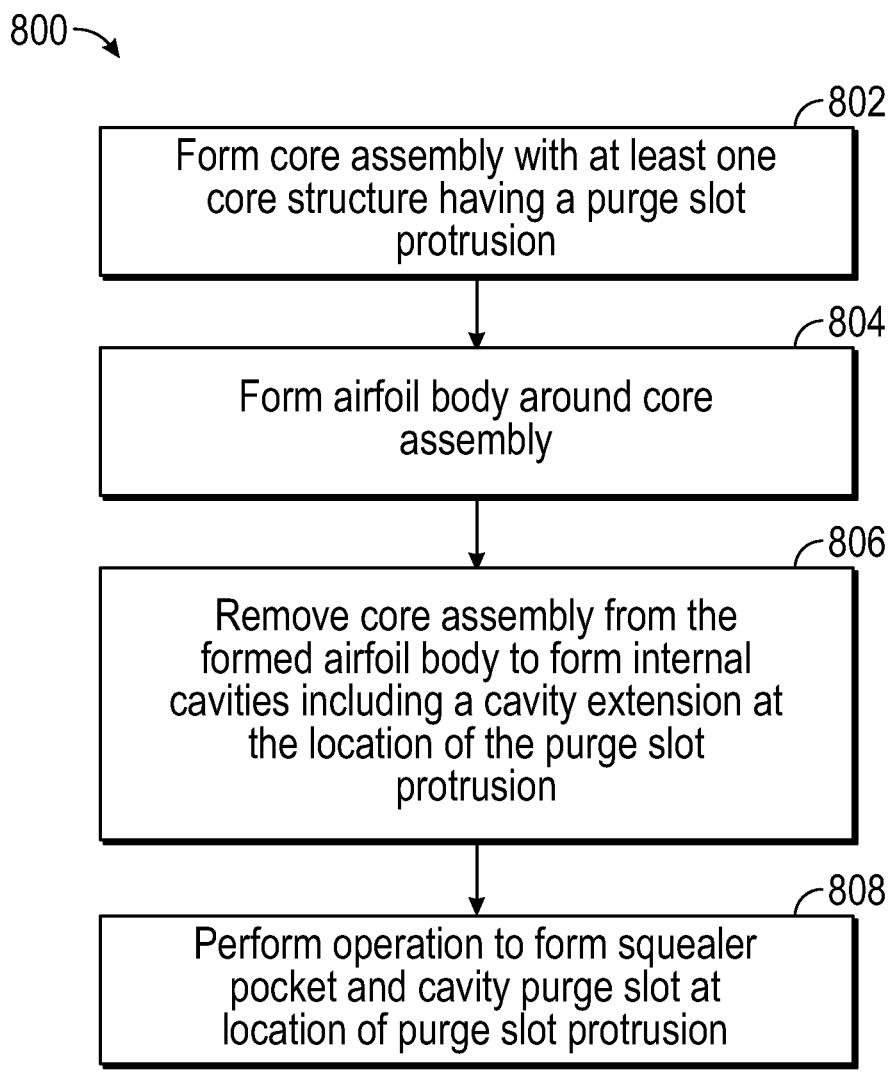
FIG. 8 is a flow process for manufacturing an airfoil in accordance with an embodiment of the present disclosure.

Turning now to FIG. 8, a flow process 800 for manufacturing an airfoil in accordance with an embodiment of the present disclosure is shown. The flow process 800 may be employed to form an airfoil as shown and described above, or other airfoil configurations that include one or more cores/internal cavities that are too small, narrow, or otherwise dimensioned such that a rod or drilling operation may not be employed to form a cavity purge hole.

At block 802, a core assembly is formed with at least one core structure having a purge slot protrusion. The core assembly can include one or more core structures. For example, a single core structure may be employed to form an airfoil having a single internal cooling cavity. However, typically, multiple core structures will be formed and arranged to form multiple different (separate or connected) internal cavities of an airfoil. One or more core structures may include such purge slot protrusions and further a single core structure can include multiple purge slot protrusions if desired, and depending on the configuration of the airfoil and internal cooling scheme thereof.

At block 804, an airfoil body is formed around the core assembly. The formation of the airfoil body about the core assembly may be by casting, as will be appreciated by those of skill in the art.

At block 806, the core assembly is removed from the formed airfoil body to form one or more internal cavities. At least one internal cavity will include a cavity extension at the location of the purge slot protrusion. The removal process may be done by known means and mechanisms.

At block 808, an operation is performed to form a squealer pocket at the tip of the airfoil body. During such operation, an extension of the process may be employed to form or cut a recess into the material of the airfoil body proximate the location of the cavity extension. Thus, a cavity purge slot may be formed that fluidly connects the internal cavity to the squealer pocket at the location of the cavity extension. The process may be an electrode discharge machining ("EDM") process although other manufacturing processes may be employed without departing from the scope of the present disclosure.

Advantageously, embodiments described herein allow for purge mechanisms of internal cavities of airfoils that cannot be formed using traditional mechanisms (e.g., rods, drilling, etc.). According to embodiments described herein, core structures are formed with extensions at a portion of the core structure to enable the formation of a cavity extension within a formed airfoil. The formed cavity extension provides for a thinner material portion at the location thereof, thus enabling cutting or removal of such thinner material and the formation of a purge slot, as shown and described above.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for forming an airfoil for a gas turbine engine, the method comprising:
   forming an airfoil body about a core assembly configured to define one or more internal cavities of the airfoil body, the core assembly comprising at least core structure having a purge slot protrusion extending from a portion of the core structure;
   removing the core assembly from the airfoil body to form one or more internal cavities, wherein at least one internal cavity has a cavity extension defined by the purge slot protrusion; and
   forming a squealer pocket in a tip of the formed airfoil body, wherein a cavity purge slot is formed at the cavity extension to fluidly connect the respect internal cavity with the squealer pocket, wherein at least one of the squealer pocket and the cavity purge slot are formed by an electrode discharge machining process.

2. The method of claim 1, wherein the electrode discharge machining process comprises using an electrode having an electrode extension arranged to form the cavity purge slot.

3. The method of claim 2, wherein the electrode and the electrode extension are a monolithic piece.

4. The method of claim 1, wherein the core assembly comprises a plurality of core structures including a pressure side core structure and a suction side core structure, wherein the pressure side core structure defines a pressure side cavity in the formed airfoil body and the suction side core structure forms a suction side cavity in the formed airfoil, wherein the purge slot protrusion is on the suction side core.

5. The method of claim 4, wherein the core assembly further comprises a leading edge core structure and a trailing edge core structure.

6. The method of claim 4, further comprising forming at least one purge hole connecting the formed pressure side cavity by at least one of a purge hole rod and drilling.

7. The method of claim 1, wherein the core structure having the purge slot protrusion has a dimension in a direction from a pressure side to a suction side of the formed airfoil of about 0.075 inches or less.

8. A core assembly for formation of an airfoil for a gas turbine engine, the core assembly comprising:
 a core structure configured to define an internal cavity of an airfoil, the core structure extending from a base to a tip; and
 a purge slot protrusion extending from a portion of the core structure proximate the tip, the purge slot protrusion configured to form a cavity extension in the formed airfoil,
 wherein the core assembly comprises a plurality of core structures including a pressure side core structure and a suction side core structure, wherein the pressure side core structure defines a pressure side cavity in the formed airfoil body and the suction side core structure forms a suction side cavity in the formed airfoil, wherein the purge slot protrusion is on the suction side core,
 wherein the pressure side core structure defines a serpentine structure configured to form a serpentine flow path within a formed airfoil.

9. The core assembly of claim 8, wherein the core structure having the purge slot protrusion has a dimension in a direction from a pressure side to a suction side of the formed airfoil of about 0.075 inches or less.

10. The core assembly of claim 8, wherein the core assembly further comprises a leading edge core structure and a trailing edge core structure.

11. The core assembly of claim 8, wherein the pressure side core structure includes one or more purge hole rods configured to form purge holes in a formed airfoil.

12. An airfoil for a gas turbine engine, the airfoil comprising:
 an airfoil body extending between a base and a tip, the airfoil body having:
 an internal cooling cavity having a cavity extension located proximate the tip;
 a squealer pocket formed in the tip of the airfoil body, the squealer pocket having a pocket base that is recessed from the tip and extends toward the cavity extension;
 a recess formed in the squealer pocket and extending away from the tip toward the cavity extension; and
 a cavity purge slot forming an aperture to fluidly connect the internal cooling cavity to the squealer pocket through the recess,
 wherein the airfoil body includes at least one additional internal cooling cavity, wherein at least one additional internal cooling cavity includes at least a pressure side cavity and the internal cooling cavity having the cavity extension is a suction side cavity.

13. The airfoil of claim 12, wherein the internal cooling cavity has a dimension in a direction from a pressure side to a suction side of the airfoil body of about 0.075 inches or less.

14. The airfoil of claim 12, wherein the at last one additional internal cavity further includes a leading edge cavity and a trailing edge cavity.

15. The airfoil of claim 12, wherein the pressure side cavity defines a serpentine flow path within the airfoil body.

16. The airfoil of claim 12, wherein the pressure side cavity includes one or more purge holes fluidly connecting the pressure side cavity to the squealer pocket.

17. A core assembly for formation of an airfoil for a gas turbine engine, the core assembly comprising:
 a core structure configured to define an internal cavity of an airfoil, the core structure extending from a base to a tip; and
 a purge slot protrusion extending from a portion of the core structure proximate the tip, the purge slot protrusion configured to form a cavity extension in the formed airfoil,
 wherein the core assembly comprises a plurality of core structures including a pressure side core structure and a suction side core structure, wherein the pressure side core structure defines a pressure side cavity in the formed airfoil body and the suction side core structure forms a suction side cavity in the formed airfoil, wherein the purge slot protrusion is on the suction side core,
 wherein the pressure side core structure includes one or more purge hole rods configured to form purge holes in a formed airfoil.

18. A method for forming an airfoil for a gas turbine engine, the method comprising:
 forming an airfoil body about a core assembly configured to define one or more internal cavities of the airfoil body, the core assembly comprising at least core structure having a purge slot protrusion extending from a portion of the core structure;
 removing the core assembly from the airfoil body to form one or more internal cavities, wherein at least one internal cavity has a cavity extension defined by the purge slot protrusion; and
 forming a squealer pocket in a tip of the formed airfoil body, wherein a cavity purge slot is formed at the cavity extension to fluidly connect the respect internal cavity with the squealer pocket,
 wherein the core assembly comprises a plurality of core structures including a pressure side core structure and a suction side core structure, wherein the pressure side core structure defines a pressure side cavity in the formed airfoil body and the suction side core structure forms a suction side cavity in the formed airfoil, wherein the purge slot protrusion is on the suction side core.

19. A method for forming an airfoil for a gas turbine engine, the method comprising:
 forming an airfoil body about a core assembly configured to define one or more internal cavities of the airfoil body, the core assembly comprising at least core structure having a purge slot protrusion extending from a portion of the core structure;
 removing the core assembly from the airfoil body to form one or more internal cavities, wherein at least one internal cavity has a cavity extension defined by the purge slot protrusion; and
 forming a squealer pocket in a tip of the formed airfoil body, wherein a cavity purge slot is formed at the cavity extension to fluidly connect the respect internal cavity with the squealer pocket, wherein the core structure having the purge slot protrusion has a dimension in a direction from a pressure side to a suction side of the formed airfoil of about 0.075 inches or less.

\* \* \* \* \*